(12) United States Patent
O'Brien

(10) Patent No.: US 6,289,693 B1
(45) Date of Patent: Sep. 18, 2001

(54) CRYOGENIC AND MEMBRANE SYNTHESIS GAS PRODUCTION

(75) Inventor: John V. O'Brien, Shrewsbury, MA (US)

(73) Assignee: Chart Industries, Inc., Mayfield Hts., OH (US)

(*) Notice: Subject to any disclaimer, the term of this patent is extended or adjusted under 35 U.S.C. 154(b) by 0 days.

(21) Appl. No.: 09/463,535

(22) PCT Filed: Jun. 24, 1999

(86) PCT No.: PCT/US99/14338

§ 371 Date: Jan. 25, 2000

§ 102(e) Date: Jan. 25, 2000

(87) PCT Pub. No.: WO99/67587

PCT Pub. Date: Dec. 29, 1999

Related U.S. Application Data

(60) Provisional application No. 60/090,640, filed on Jun. 25, 1998.

(51) Int. Cl.[7] .................................................. F25J 3/08
(52) U.S. Cl. ............................................................ 62/624
(58) Field of Search ................................ 62/618, 620, 624

(56) References Cited

U.S. PATENT DOCUMENTS

| | | |
|---|---|---|
| 4,217,759 | 8/1980 | Shenoy . |
| 4,488,890 | 12/1984 | Foerg et al. . |
| 4,525,187 | 6/1985 | Woodward et al. . |
| 4,566,886 | 1/1986 | Fabian et al. . |
| 4,654,047 * | 3/1987 | Hopkins et al. .......................... 62/23 |
| 4,654,063 * | 3/1987 | Auvil et al. ............................... 62/18 |
| 4,732,583 * | 3/1988 | DeLong et al. ........................... 55/16 |
| 4,936,887 * | 6/1990 | Waldo et al. ............................. 62/24 |
| 5,332,424 * | 7/1994 | Rao et al. ................................. 95/47 |
| 5,351,491 | 10/1994 | Fabian . |
| 5,609,040 | 3/1997 | Billy et al. . |
| 5,647,227 * | 7/1997 | Lokhandwala ......................... 62/624 |
| 5,832,747 | 11/1998 | Bassett et al. . |

\* cited by examiner

Primary Examiner—William Doerrler
Assistant Examiner—Malik N. Drake
(74) Attorney, Agent, or Firm—Calfee, Halter & Griswold, LLP

(57) ABSTRACT

A system and process for the production of synthesis gas with a specific H2CO ratio, for example, 0.7 to 1.2 and a low residual methane content, for example, less than 5 percent (5%). Excess hydrogen from the syngas feed stream is removed by a membrane as a permeate and the retentate gas cryogenically separated.

11 Claims, 2 Drawing Sheets

CRYOGENIC AND MEMBRANE SYNTHESIS GAS PRODUCTION

REFERENCE TO PRIOR APPLICATION

This application incorporates by reference and claims the benefit of U.S. Provisional Patent Application Ser. No. 60/090,640, filed Jun. 25, 1998.

BACKGROUND OF THE INVENTION

Synthetic natural gas or syngas comprises a gaseous mixture derived from carbon sources and contains chiefly hydrogen ($H_2$) and carbon monoxide (CO) together with low amounts of other gases.

Synthetic gases of varying and controlled $H_2/CO$ molar ratios are employed in various petrochemical processes, such as the production of methanol and oxo alcohols, aldehydes, acids, and other chemical compounds. One type of synthetic gas is produced by the reaction of steam and methane in a reformer, which reaction provides a synthesis gas, after carbon dioxide removal, of about a $H_2/CO$ molar ratio of three (3) and a residual methane content of up to about five percent (5%).

It is desirable to produce a synthesis gas of a selected and lower $H_2/CO$ molar ratio for use in particular petrochemical processes, such as a molar ratio of about 0.9 to 1.0 and also with a lower methane content.

U.S. Pat. No. 5,832,747, issued Nov. 10, 1998, hereby incorporated by reference, discloses a wholly cryogenic process for the cryogenic adjustment of the hydrogen and carbon monoxide molar ratio of a syngas, typically of even molar ratio. The process comprises partially condensing, in a cold box, at least a portion of the gaseous feed mixture and then separating the partially condensed feed mixture in a phase separator, to provide a gaseous product stream of a different $H_2/CO$ molar ratio than the gaseous feed. The process includes warming the resultant product stream without any further cryogenic separation.

It is desirable to provide a new and improved process and system for providing from a syngas, a product gas of a defined selected $H_2/CO$ molar ratio and a low methane content.

SUMMARY OF THE INVENTION

The invention comprises a system and process for the production of a synthesis gas having a specific $H_2/CO$ molar ratio, such as in the range of 0.7 to 1.2 and a low residual methane content. The system and process comprises employing a combination of membrane separations to remove excess hydrogen from the syngas feed, and the subsequent cryogenic separation of excess methane to provide a gaseous product stream with a selected $H_2/CO$ molar ratio; for example, of about 0.7 to 1.2 or other selected $H_2/CO$ ratio, and where applicable, a methane content of less than about 1.5 percent (1.5%).

In one embodiment, syngas from a steam-methane reformer system with a high molar ratio of $H_2/CO$, and with residual methane, is treated to remove carbon dioxide. The syngas is then heated, typically with steam, and introduced into a semipermeable membrane unit or system. Excess hydrogen is removed as a permeate gas and a retentate or treated gas stream of the desired $H_2/CO$ molar ratio withdrawn; such as, but not limited to: 0.7 to 1.2, or such other ratio as required in the particular petrochemical process in which the syngas is to be employed. The excess permeate hydrogen gas may be recompressed and employed for and in subsequent cryogenic cold boxes or employed for other purposes. The retentate gas contains undesirable high amounts of methane, which is removed by cryogenic fractionation or as a bottoms stream, while the syngas ($H_2/CO$) of desired $H_2/CO$ molar ratio is withdrawn as an overhead stream.

The membrane removal of excess hydrogen or other excess gases from the syngas feed stream is accomplished by one or more semipermeable membrane systems, or units in series or in parallel with the particular semipermeable membrane material selected for the particular gas to be removed as an excess gas; such as, but not limited to: polymeric and metal membranes.

There are a wide variety of membrane materials and designs employed to remove hydrogen gas as a permeate gas. The membrane may comprise hollow fibers or tubes, flat sheets, or spiral wound membranes. Generally, the excess hydrogen removed as a permeate is at a pressure of about 100 psig and may be recompressed for other uses in the process or in other processes.

The system and process shall be described in a particular embodiment directed to the treatment of a syngas feed stream from a steam-methane transformer, with the object to produce a $H_2/CO$ molar ratio of about 0.9 and with a low residual methane content of 1.5 percent (1.5%) or lower. However, it is recognized that other syngas treatment streams may be used and other molar ratios obtained by employing a combination of a membrane separations to remove hydrogen from or adjust the feed gas stream composition, followed by cryogenic-fractionating of the retentate gas stream, to remove high boiling point materials like alkanes, such as methane, and to recover an adjusted $H_2/CO$ molar ratio product stream.

DESCRIPTION OF THE EMBODIMENTS

Figure 1:
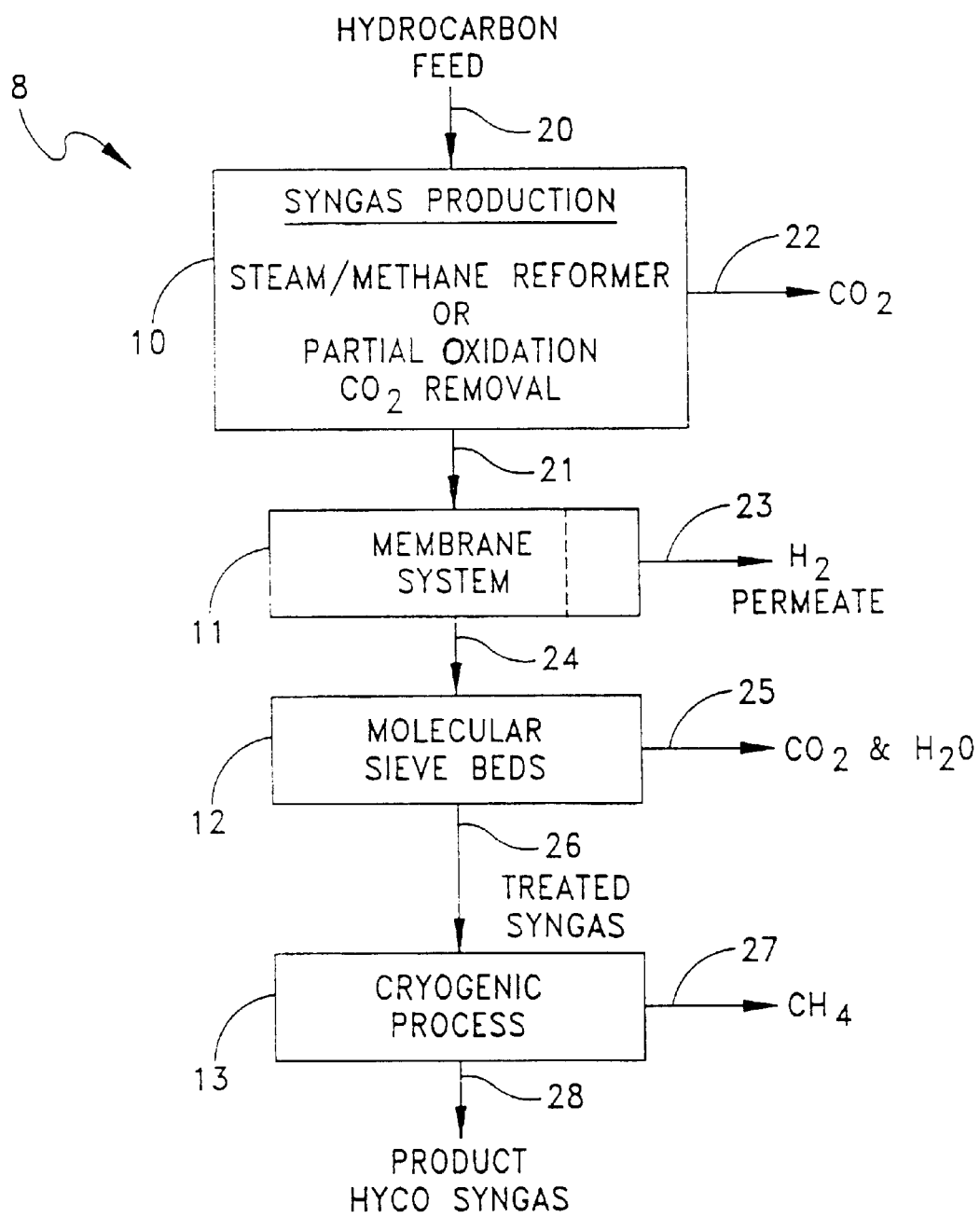
FIG. 1 is a block flow, illustrative diagram of the system and process of the invention.

In FIG. 1, the process steps are numbered by the 10+ series, while the streams are numbered by the 20+ series.

The hydrocarbon feed 20 may be gaseous, of the form natural gas or liquid, NGL (Natural Gas Liquid) components, ethane or heavier alkanes, or a liquid distillate.

The feedstock, after flowing through the syngas production system 10 comprises a mixture of $H_2$, CO, $CO_2$ and $CH_4$. This system may be a steam reformer or a partial oxidation process.

The $CO_2$ 22 is removed and vented to the atmosphere or recycled to Syngas Production System 10 to increase the carbon yield of the process.

The raw syngas 21 then enters the membrane system 11, where excess hydrogen is removed as a permeate stream 23. By adjusting the backpressure on stream 23, the quantity of hydrogen removed can be varied, and thus, the plant can operate to achieve the desired $H_2CO$ ratio.

The $H_2/CO$ ratio adjusted syngas 24 now flows to a set of molecular sieve beds 12, where the residual $CO_2$ and water vapor are removed 25, so the treated syngas 26 has less than 0.1 ppm of either component to avoid blockages due to formation of solids in the downstream cryogenic process.

The cryogenic process 13 employs a distillation column to produce an overhead vapor product 28, whose methane content is reduced to an adequate level, typically 1½ to 2½ percent for its subsequent usage. The methane 27 is removed in the column bottoms stream and sent for use as fuel gas or recycled to the reaction step 10.

These process steps: 10, 11, 12, and 13 are operated at the same pressure level in the range of about 200 to 500 psig, typically 300 to 400 psig.

Figure 2:
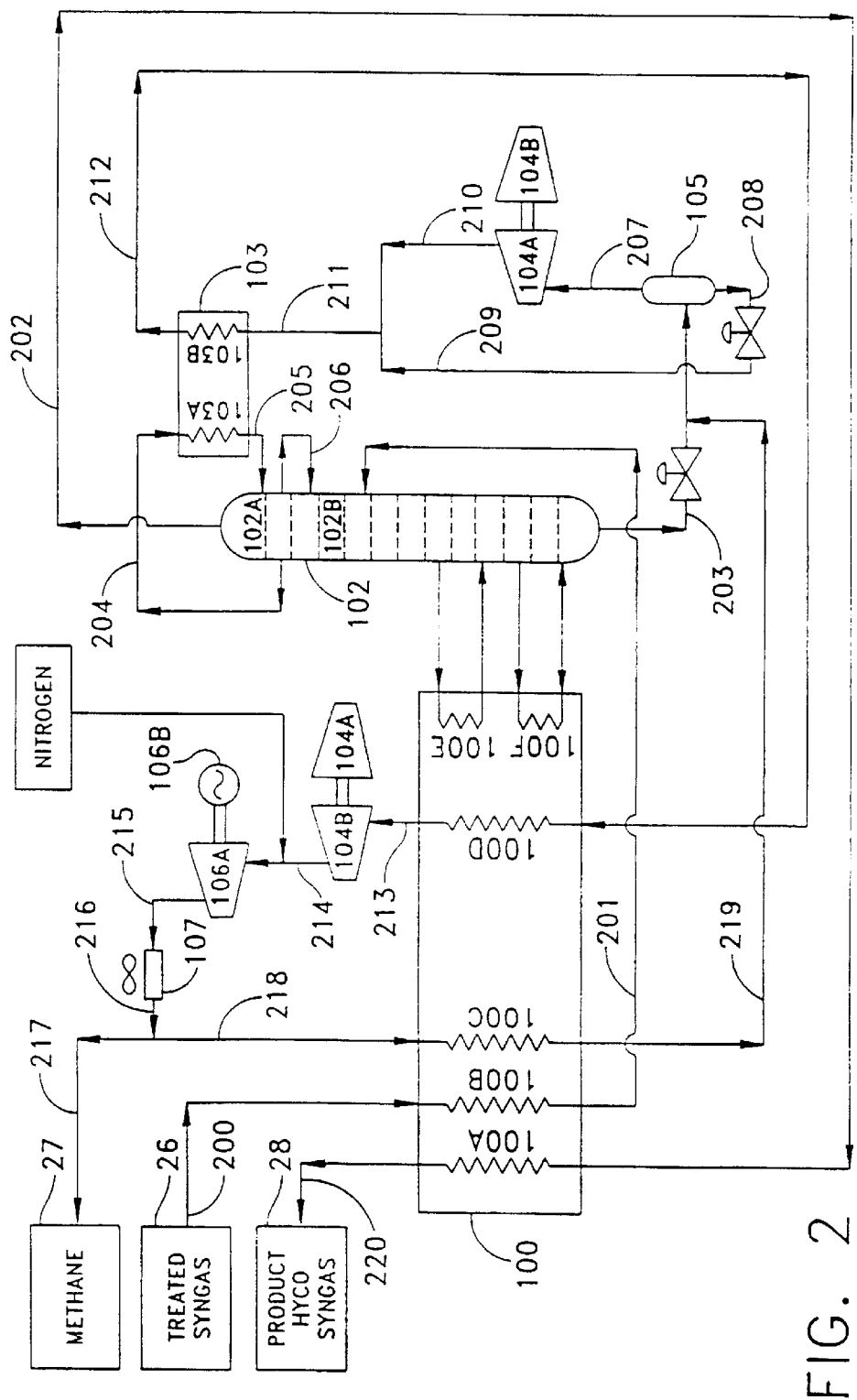
FIG. 2 is a schematic process and system illustration of the production of a synthetic natural gas with a $H_2/CO$ molar ratio of about 0.9 from a steam-methane reformer.

FIG. 2 is one embodiment of the cryogenic methane rejection process 13. Process equipment embodiments are referred to by the 100+ series. Process streams embodiments are referred to by the 200+ series.

In the following example of this process configuration, specific process conditions are provided. These process conditions can be adjusted by those skilled in the art to accommodate changes in feedstock and product requirements.

The treated syngas 26 comes from the molecular sieve beds 12, where $CO_2$ and water vapor have been removed to low residual values below 0.1 ppm. The conditions of the relevant process streams are listed in the following Table:

| Botanical Name | Common Name | Preferred Source |
|---|---|---|
| Tanacetum parthenium | Feverfew | leaf |
| Zingibar officinale | Ginger | rhizome |
| Curcuma longa | Turmeric | rhizome |
| Coriandrum sativum | Cilantro/Coriander | seed |
| Centella asiatica | Gotu Kola | entire plant |
| Oenothera biennis | Evening Primrose | seed |
| Valeriana officinalis | Valerian | root |
| Tabebuia impetiginosa | Pau D' Arco | bark |
| Thymus vulgaris | Thyme | leaf |
| Sambucus nigra | Elderberry | leaf and flower |

Feed gas stream 200 enters the multistream heat exchanger 100 through passage 100B, where feed gas stream 200 is partially condensed, emerging as stream 201 at −242° F. and 4 percent (4%) molar liquid. This stream 201 enters the distillation column 102 operating at 355 psig. This column 102 contains trays as vapor/liquid contacting devices 102B shown in dashed lines, and a reflux drum contained by a solid plate 102A at the top of the column. There is a bottom reboiler 100F and a side reboiler 100E contained in heat exchanger 100.

The hydrogen/carbon monoxide stream 210 has the methane fractionated from it by the reflux condenser 103. The tower top stream 204 is extracted below plate 102A and enters passage 103A of reflux condenser 103, where the tower top stream 204 is partially condensed to stream 205, which flows to the reflux drum section above plate 102A contained in column 102. The liquid is separated and returns to the tower as reflux stream 206. The column overhead vapor product is stream 202.

The liquids flowing down the column 102 are stripped of $H_2$ and CO by the bottom and side reboilers 100E and 100F to produce bottoms stream 203 of low residual CO content, thereby maximizing the recovery of CO in the overhead product stream 202. This overhead stream 202 is reheated in exchanger 100 in passage 100A, and exported as the product HYCO (hydrogen/carbon monoxide mix) syngas stream 220.

The column 102 bottoms stream 203 is depressurized to 132 psig, entering vapor/liquid separation drum 105. Recycle stream 219 combines with it prior to drum 105. The vapor stream 207, at −199° F., is expanded isentropically in expander 104A to stream 210. The liquid stream 208 from drum 105 is depressurized to 6.6 psig as steam 209. Streams 209 and 210 are combined to form the refrigerating stream 211 in passage 103B in heat exchanger 103. The emerging stream 212 is reheated stream 213 in passage 100D in exchanger 100.

The reheated stream 213 compressed in the expander 104A driven compressor 104B from 5 to 10 psig to form compressed stream 214 and then in subsequent electric motor 106B driven compressor 106A to 145 psig to form stream 215. Aerial aftercooler 107 reduces the temperature of the gas stream 216 to 104° F.

The gas stream 216 is split into methane stream 217 from the cryogenic process and recycled stream 218 which is recycled to the cryogenic process for the purpose of supplying the refrigeration for the cycle.

The recycled stream 218 is partially condensed in passage 100C of exchanger 100 to stream 219 at −202° F. and 20 percent (20%) liquid. The stream 219 enters drum 105 and closes the refrigeration balance for the system.

The recycled stream 218 contains CO from the bottoms stream 203 of column 102 in an amount adequate to provide adequate temperature differential in reflux condenser 103. This CO is also lost in the methane product stream 217.

A method of reducing or avoiding this CO loss is by injecting nitrogen into the refrigeration cycle, shown and employed to stream 214. Alternative locations where this method may be employed are to streams 213 or 218 depending on the pressure of the nitrogen stream. This injected nitrogen is purged from the cycle with the methane stream 217. It cannot contaminate the HYCO product, since the column pressure of about 355 psig is higher than the refrigeration cycle pressure of about 140 psig.

In this cryogenic process, the distillation column 102 operates at the syngas feed pressure, the product HYCO syngas stream 220 emerges at the system pressure drop lower pressure level. The example is shown with the feed gas stream 200 at 363 psig. The operating pressure of the system can be in the range of 200 to 500 psig.

what is claimed is:

1. A process for adjusting the molar ratio of $H_2$/CO and reducing the methane level in a syngas feed stream which contains hydrogen, carbon monoxide and methane, and which process comprises:
    a) removing excess hydrogen from the syngas feed stream by a semipermeable membrane, to provide an excess hydrogen permeate stream and a retentate syngas stream of selected $H_2$/CO molar ratio and methane;
    b) cryogenically separating the methane from the retentate syngas stream; and
    c) recovering a syngas product stream of selected and lower $H_2$/CO molar ratio and lower the methane content than the syngas feed stream.

2. The process of claim 1 wherein the syngas feed stream comprises a gas feed stream from a steam-methane reformer.

3. The process of claim 1 wherein the syngas product stream has a $H_2$/CO molar ratio of about 0.7 to 1.2.

4. The process of claim 1 wherein the syngas product stream has a methane content of less than about 1.5 percent (1.5%).

5. The process of claim 1 wherein the syngas feed stream comprises a $H_2$/CO ratio of about 3 and has a methane content of about 3 to 15 percent.

6. The process of claim 1 which includes compressing the permeate hydrogen and recovering the compressed hydrogen.

7. The process of claim 1 which includes cryogenically separating the retentate gas stream, by cooling the retentate gas stream in a multistream heat exchanger, and separating the cooled stream in a cryogenic fractionating column into methane as a bottoms stream, and the $H_2/CO$ of required molar ratio as an overhead product stream.

8. The process of claim 7 which includes employing the methane bottoms stream as a refrigerant for an overhead condenser to the fractionating column.

9. The process of claim 8 which includes employing the methane bottoms stream as a refrigerant in the multistream heat exchanger.

10. A system for the adjusting of the molar ratio of $H_2/CO$ in a syngas feed stream to a lower $H_2/CO$ ratio and with low methane content, which system comprises:

a) a steam-methane reformer to provide a syngas feed stream;

b) a semipermeable membrane system to provide a permeate stream of excess hydrogen and a retentate stream of selected lower $H_2/CO$ molar ratio;

c) a multistream heat exchanger to cool the retentate stream, and a $H_2/CO$ product stream employing a recovered methane stream;

d) a cryogenic fractionating column to separate a cooled retentate stream into an overhead product stream of a selected and lower $H_2/CO$ ratio, and a methane bottoms stream for use in the multistream heat exchanger;

e) a means to withdraw a cooled $H_2/CO$ molar ratio product stream from the multistream heat exchanger; and f) a means to withdraw a methane stream.

11. A system for adjusting the $H_2/CO$ molar ratio of a syngas feed stream to a lower ratio and less than about 1.5 percent (1.5%) methane content, which system comprises:

a) a semipermeable membrane means to separate to syngas feed stream into a permeate stream of excess hydrogen and a retentate stream of selected $H_2/CO$ molar ratio and methane; and b) a cryogenic separating means to separate the retentate stream into a methane stream and a syngas product stream of a selected and lower $H_2/CO$ molar ratio and less than about 1.5 percent (1.5%) methane.

* * * * *

UNITED STATES PATENT AND TRADEMARK OFFICE
CERTIFICATE OF CORRECTION

PATENT NO. : 6,289,693 B1
DATED : September 18, 2001
INVENTOR(S) : John V. O'Brien Page 1 of 1

It is certified that error appears in the above-identified patent and that said Letters Patent is hereby corrected as shown below:

Column 3,
Please delete the Table, and insert the following Table:

| Stream | 200 | 220 | 217 | 213 |
|---|---|---|---|---|
| Composition, Mol% | | | | |
| $H_2$ | 42.50 | 47.48 | 0.00 | 0.00 |
| CO | 47.80 | 50.69 | 23.18 | 23.18 |
| $CH_4$ | 9.40 | 1.50 | 76.77 | 76.77 |
| $N_2$ | 0.30 | 0.33 | 0.05 | 0.05 |
| Total: | 100.00 | 100.00 | 100.00 | 100.00 |
| Flow, lb.mol/hr. | 1000.0 | 894.9 | 105.1 | 457.0 |
| Temp. °F | 104 | 84 | 104 | 84 |
| Pressure, psig | 363 | 350 | 140 | 5.0 |

Signed and Sealed this

Fifth Day of March, 2002

Attest:

JAMES E. ROGAN
Attesting Officer   Director of the United States Patent and Trademark Office